(12) United States Patent
Suitou et al.

(10) Patent No.: US 6,519,960 B2
(45) Date of Patent: Feb. 18, 2003

(54) AIR CONDITIONER

(75) Inventors: Ken Suitou, Kariya (JP); Masahiro Kawaguchi, Kariya (JP); Masaki Ota, Kariya (JP); Kazuya Kimura, Kariya (JP); Ryo Matsubara, Kariya (JP); Taku Adaniya, Kariya (JP); Kazuhito Miyagawa, Kariya (JP); Yasutane Hijikata, Nagoya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 73 days.

(21) Appl. No.: 09/860,091

(22) Filed: May 17, 2001

(65) Prior Publication Data

US 2002/0011074 A1 Jan. 31, 2002

(30) Foreign Application Priority Data

May 18, 2000 (JP) ........................................ 2000-146167

(51) Int. Cl.[7] .............................. F25B 41/04; F04B 1/26
(52) U.S. Cl. ................. 62/228.3; 417/222.2; 73/861.66
(58) Field of Search ............................ 62/228.3, 228.5; 417/222.2; 73/861.47, 861.66

(56) References Cited

U.S. PATENT DOCUMENTS 3,581,565 A * 6/1971 Dieterich ................. 73/861.66
6,425,254 B1 * 7/2002 Ota et al. ..................... 62/133

FOREIGN PATENT DOCUMENTS

| JP | 2-049976 | 2/1990 | .......... F04B/27/08 |
| JP | 11-324930 | 11/1999 | .......... F04B/49/00 |

* cited by examiner

Primary Examiner—William Wayner
(74) Attorney, Agent, or Firm—Morgan & Finnegan, LLP

(57) ABSTRACT

A control valve is located in a variable displacement compressor that is installed in a refrigerant circuit. The control valve operates such that the pressure difference between first and second pressure monitoring points in the refrigerant circuit seeks a predetermined target value. The first pressure monitoring point is located in a discharge chamber of the compressor. The second pressure monitoring point is located in a flow pipe that extends from the discharge chamber. The static pressure of refrigerant in the discharge chamber is introduced into a control valve from the first pressure monitoring point. A pressure that includes the static pressure and the dynamic pressure of refrigerant in the flow pipe is introduced into the control valve from the second pressure monitoring point. As a result, the displacement of the compressor is reliably controlled without being affected by the thermal load of an evaporator.

16 Claims, 7 Drawing Sheets

AIR CONDITIONER

BACKGROUND OF THE INVENTION

The present invention relates to a vehicle air conditioner.

A typical refrigerant circuit in a vehicle air-conditioner includes a condenser, an expansion valve, an evaporator and a compressor. The compressor is driven by a vehicle engine. The compressor draws refrigerant gas from the evaporator, then, compresses the gas and discharges the compressed gas to the condenser. The evaporator performs heat exchange between the refrigerant in the refrigerant circuit and the air in the passenger compartment. The heat of air at the evaporator is transmitted to the refrigerant flowing through the evaporator in accordance with the thermal load or the cooling load. Therefore, the pressure of refrigerant gas at the outlet of or the downstream portion of the evaporator represents the cooling load.

Variable displacement compressors are widely used in vehicles. Such compressors include a displacement control valve that operates to maintain the pressure at the outlet of the evaporator, or the suction pressure, at a predetermined target level (target suction pressure). The control valve feedback controls the displacement of the compressor by referring to the suction pressure such that the flow rate of refrigerant in the refrigerant circuit corresponds to the cooling load.

However, when the engine speed is changed and the flow rate of refrigerant is changed, accordingly, the displacement of the compressor may not be immediately changed. For example, if the engine speed and the flow rate of the refrigerant are increased when the thermal load of the evaporator is high, the compressor displacement will not be decreased until the actual suction pressure falls below the target suction pressure. Therefore, as the engine speed increases, the mechanical work for driving the compressor increases, accordingly, which lowers the fuel economy.

BRIEF SUMMARY OF THE INVENTION

Accordingly, it is an objective of the present invention to provide an air conditioner that permits a variable displacement compressor to maintain a target control value for controlling the compressor displacement without being affected by thermal load of an evaporator.

To achieve the foregoing and other objectives and in accordance with the purpose of the present invention, an air conditioner including a refrigerant circuit is provided. The refrigerant circuit has a variable displacement compressor. A first pressure monitoring point and a second pressure monitoring point are located in the refrigerant circuit. The second pressure monitoring point is downstream of the first pressure monitoring point. The air conditioner includes a displacement control mechanism, which controls the displacement of the compressor based on the pressure difference between the first and second pressure monitoring points such that the pressure difference seeks a predetermined target value. The first pressure monitoring point or the second pressure monitoring point is arranged in the refrigerant circuit such that a pressure that includes the dynamic pressure of refrigerant in the refrigerant circuit is introduced into the displacement control mechanism through the first pressure monitoring point or the second pressure monitoring point.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
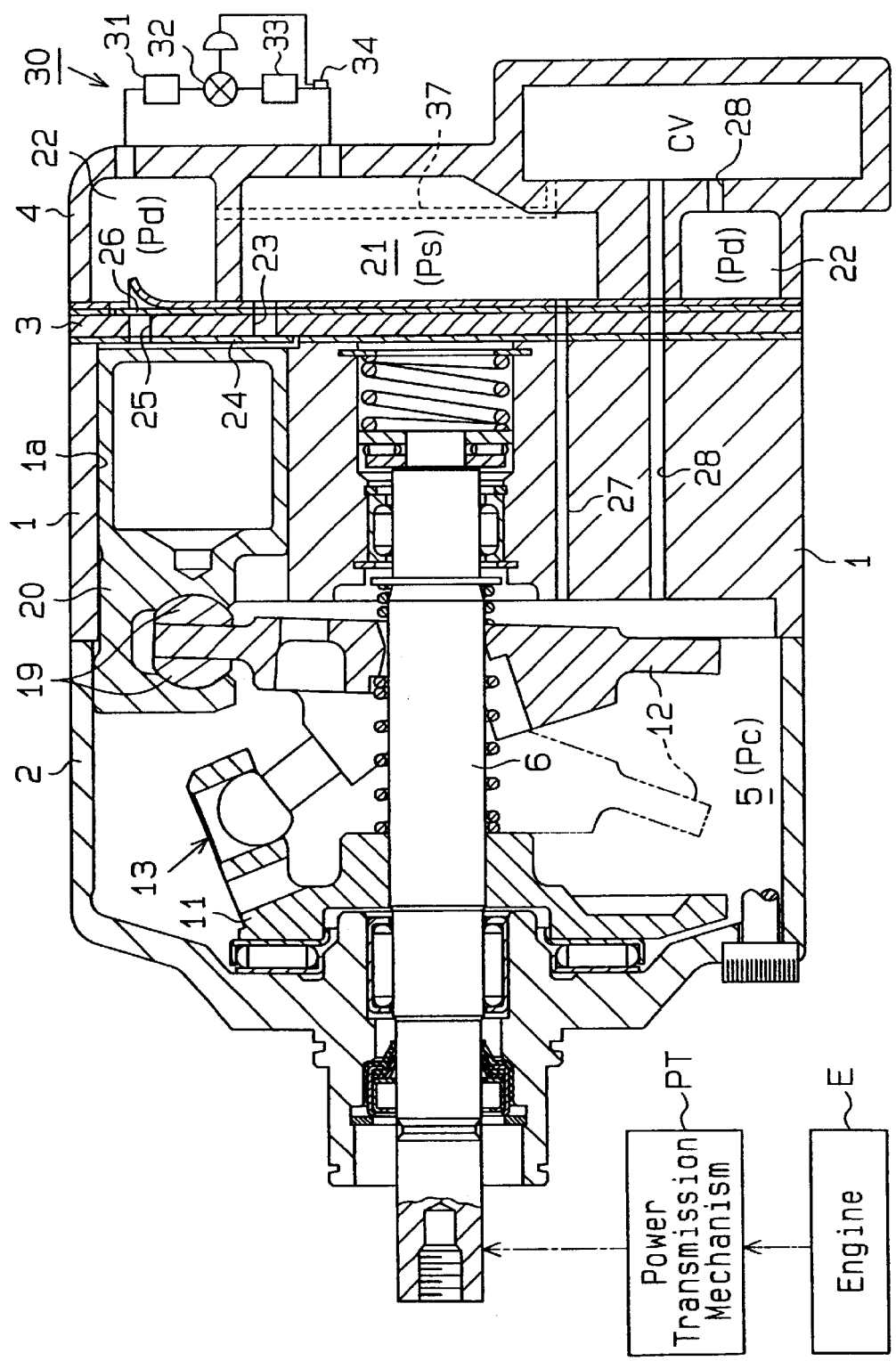
FIG. 1 is a cross-sectional view illustrating a swash plate type variable displacement compressor according to a first embodiment of the present invention.

First to third embodiment of the present invention will now be described. In describing the second and third embodiments, only the differences from the first embodiment will be discussed. Same or like reference numerals are given to parts in the second and third embodiments that are the same as or like corresponding parts of the first embodiment.

The compressor shown in FIG. 1 includes a cylinder block 1, a front housing member 2 connected to the front end of the cylinder block 1, and a rear housing member 4 connected to the rear end of the cylinder block 1. A valve plate 3 is located between the rear housing member 4 and the cylinder block 1.

A crank chamber 5 is defined between the cylinder block 1 and the front housing member 2. A drive shaft 6 is supported in the crank chamber 5 by bearings. A lug plate 11 is fixed to the drive shaft 6 in the crank chamber 5 to rotate integrally with the drive shaft 6.

The front end of the drive shaft 6 is connected to an external drive source, which is an engine E in this embodiment, through a power transmission mechanism PT. In this embodiment, the power transmission mechanism PT is a clutchless mechanism that includes, for example, a belt and a pulley. Alternatively, the mechanism PT may be a clutch mechanism (for example, an electromagnetic clutch) that selectively transmits power in accordance with the value of an externally supplied current.

A drive plate, which is a swash plate 12 in this embodiment, is accommodated in the crank chamber 5. The swash plate 12 slides along the drive shaft 6 and inclines with respect to the axis of the drive shaft 6. A hinge mechanism 13 is provided between the lug plate 11 and the swash plate 12. The swash plate 12 is coupled to the lug plate 11 and the drive shaft 6 through the hinge mechanism 13. The swash plate 12 rotates synchronously with the lug plate 11 and the drive shaft 6.

Cylinder bores 1a (only one is shown in FIG. 1) are formed in the cylinder block 1 at constant angular intervals around the drive shaft 6. Each cylinder bore 1a accommodates a single headed piston 20 such that the piston 20 can reciprocate in the bore 1a. A compression chamber, the displacement of which varies in accordance with the reciprocation of the piston 20, is defined in each bore 1a. The front end of each piston 20 is connected to the periphery of the swash plate 12 through a pair of shoes 19. The rotation of the swash plate 12 is converted into reciprocation of the pistons 20, and the strokes of the pistons 20 depend on the inclination angle of the swash plate 12.

The valve plate 3 and the rear housing member 4 define, between them, a suction chamber 21 and a discharge chamber 22, which surrounds the suction chamber 21. The valve plate 3 forms, for each cylinder bore 1a, a suction port 23, a suction valve flap 24 for opening and closing the suction port 23, a discharge port 25, and a discharge valve flap 26 for opening and closing the discharge port 25. The suction chamber 21 communicates with each cylinder bore 1a through the corresponding suction port 23, and each cylinder bore 1a communicates with the discharge chamber 22 through the corresponding discharge port 25.

When each piston 20 moves from its top dead center position to its bottom dead center position, the refrigerant gas in the suction chamber 21 flows into the cylinder bore 1a through the corresponding suction port 23 and the corresponding suction valve, flap 24. When the piston 20 moves from its bottom dead center position toward its top dead center position, the refrigerant gas in the cylinder bore 1a is compressed to a predetermined pressure, and it forces the corresponding discharge valve flap 26 to open. The refrigerant gas is then discharged through the corresponding discharge port 25 and the corresponding discharge valve flap 26 into the discharge chamber 22.

The inclination angle of the swash plate 12 (the angle between the swash plate 12 and a plane perpendicular to the axis of the drive shaft 6) is determined on the basis of various moments such as the moment of rotation caused by the centrifugal force upon rotation of the swash plate, the moment of inertia based on the reciprocation of the pistons 20, and a moment due to the gas pressure. The moment due to the gas pressure is based on the relationship between the pressure in the cylinder bores 1a and the crank pressure Pc. The moment due to the gas pressure increases or decreases the inclination angle of the swash plate 12 in accordance with the crank pressure Pc.

In this embodiment, the moment due to the gas pressure is changed by controlling the crank pressure Pc with a displacement control valve CV. The inclination angle of the swash plate 12 can be changed to an arbitrary angle between the minimum inclination angle (shown by a solid line in FIG. 1) and the maximum inclination angle (shown by a broken line in FIG. 1).

Figure 2:
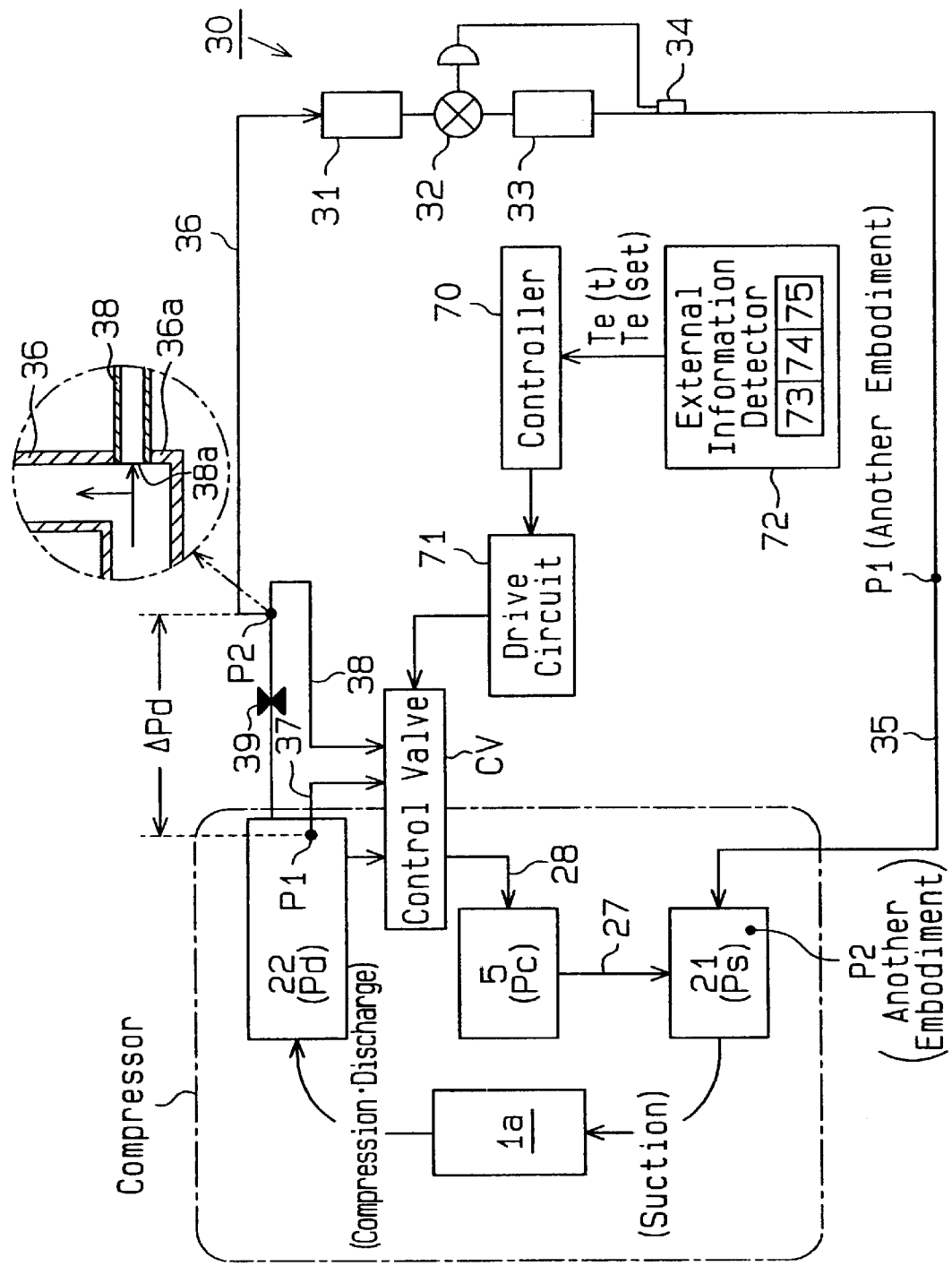
FIG. 2 is a circuit diagram schematically showing a refrigerant circuit.

As shown in FIGS. 1 and 2, a control mechanism for controlling the crank pressure Pc includes a bleed passage 27, a supply passage 28 and a displacement control valve CV. The bleed passage 27 connects the suction chamber 21, which is a suction pressure (Ps) zone, and the crank chamber 5. The supply passage 28 connects the discharge chamber 22, which is a discharge pressure (Pd) zone, and the crank chamber 5. The displacement control valve CV is provided midway along the supply passage 28.

The displacement control valve CV changes the opening size of the supply passage 28 to control the flow rate of refrigerant gas flowing from the discharge chamber 22 to the crank chamber 5. The pressure in the crank chamber 5 is changed in accordance with the relation between the flow rate of refrigerant gas flowing from the discharge chamber 22 into the crank chamber 5 and the flow rate of refrigerant gas flowing out from the crank chamber 5 through the bleed passage 27 into the suction chamber 21. In accordance with changes in the crank pressure Pc, the difference between the crank pressure Pc and the pressure in the cylinder bores 1a varies to change the inclination angle of the swash plate 12. As a result, the stroke of the pistons 20 is changed to control the displacement.

As shown in FIGS. 1 and 2, the refrigerant circuit of the vehicle air conditioner includes the compressor and an external refrigerant circuit 30. The external refrigerant circuit 30 includes, for example, a condenser 31, a decompression device, which is an expansion valve 32 in this embodiment, and an evaporator 33. The opening of the expansion valve 32 is feedback-controlled on the basis of the temperature detected by a temperature sensing tube 34 provided near the outlet of the evaporator 33. The expansion valve 32 supplies a quantity of refrigerant corresponding to the thermal load to control the flow rate.

In the downstream part of the external refrigerant circuit 30, a low pressure passage, which is a flow pipe 35 in this embodiment, is provided to connect the outlet of the evaporator 33 with the suction chamber 21. In the upstream part of the external refrigerant circuit 30, a high pressure passage, which is a flow pipe 36 in this embodiment, is provided to connect the discharge chamber 22 of the compressor with the inlet of the condenser 31. To accommodate the refrigerant circuit in the vehicle, the flow pipe 36 has a bent portion 36a, at which the pipe 36 is bent at a right angle. The compressor draws refrigerant gas from the downstream side of the external refrigerant circuit 30, compresses the gas, and then discharges the compressed gas to the discharge chamber 22, which is connected to the upstream side of the external refrigerant circuit 30.

The higher the flow rate of the refrigerant flowing in the refrigerant circuit is, the greater the pressure loss per unit length of the circuit or piping is. More specifically, the pressure loss between two pressure monitoring points P1, P2 in the refrigerant circuit correlates with the flow rate of the refrigerant circuit. Detected difference in pressure (pressure difference $\Delta Pd$) between the pressure monitoring points P1 and P2 represents the flow rate of refrigerant in the refrigerant circuit.

In this embodiment, an upstream, or first, pressure monitoring point P1 is located in the discharge chamber 22, which is the most upstream part of the flow pipe 36. A downstream, or second, pressure monitoring point P2 is set midway along the flow pipe 36 at a position separated from the first pressure monitoring point P1 by a predetermined distance. The gas pressure PdH at the first pressure monitoring point P1 and the gas pressure PdL at the second pressure monitoring point P2 are applied to the displacement control valve CV through first and second pressure introduction passages 37 and 38, respectively.

A fixed restrictor 39 is located between the first pressure monitoring point P1 and the second pressure monitoring point P2. The fixed restrictor 39 increases the pressure difference $\Delta Pd(\Delta Pd = PdH - PdL)$ between the two pressure monitoring points P1 and P2. The restrictor 39 permits the distance between the two pressure monitoring points P1 and P2 to be reduced and also permits the second pressure monitoring point P2 to be relatively close to the compressor (the discharge chamber 22). Thus, the second pressure introduction passage 38, which extends from the second pressure monitoring point P2 to the control valve CV in the compressor, is shortened.

Since the first pressure monitoring point P1 is located in the discharge chamber 22, the static pressure of refrigerant gas in the discharge chamber 22 is introduced to the control valve CV and is used as the monitored pressure PdH at the first pressure monitoring point P1. That is, since the volume of the discharge chamber 22 is relatively great, refrigerant gas flows relatively slowly and the ratio of dynamic pressure to the total pressure is low. Further, flows of refrigerant from the cylinder bores 1a are tangled in the discharge chamber 22. Therefore, regardless of how and to which part the first pressure introduction passage 37 is connected to the discharge chamber 22, the dynamic pressure in the discharge chamber 22 is scarcely reflected to the monitored pressure PdH. The first pressure introduction passage 37 is connected to the discharge chamber 22 preferably by the route shown by broken lines in FIG. 1 to minimize the influence of the dynamic pressure on the monitored pressure PdH. That is, the opening of the first pressure introduction passage 37 in the discharge chamber 22 is preferably spaced from the discharge ports 25 and the opening of the flow pipe 36.

The second pressure monitoring point P2 is illustrated in the enlarged circle in FIG. 2. The second pressure introduction passage 38, which is linear, connected to the bent portion 36a of the pipe 36. The center of the opening 38a of the passage 38 in the pipe 36 is aligned with the axis of a part of the pipe 36 that is upstream of the bent portion 36a. Therefore, the total pressure of refrigerant flowing through the second pressure monitoring point P2, in other words, the sum of the static pressure and the total dynamic pressure element, is used as the pressure PdL, which is monitored at the second pressure monitoring point P2, and is introduced to the control valve CV.

When the flow rate of refrigerant in the refrigerant circuit is low, most of the total pressure of refrigerant that is flowing through the second pressure monitoring point P2 is static pressure. However, as the flow rate increases, or as the flowing speed of refrigerant increases, the dynamic pressure is increased above the static pressure. As a result, the ratio of the dynamic pressure to the total pressure increases. That is, compared to a comparison example, in which the static pressure at the second pressure monitoring point P2 is used as the monitored pressure PdL (the monitored pressure PdH at the first pressure monitoring point P1 is also a static pressure), higher monitored pressure PdL is introduced into the control valve CV as the flow rate increases.

Figure 4:
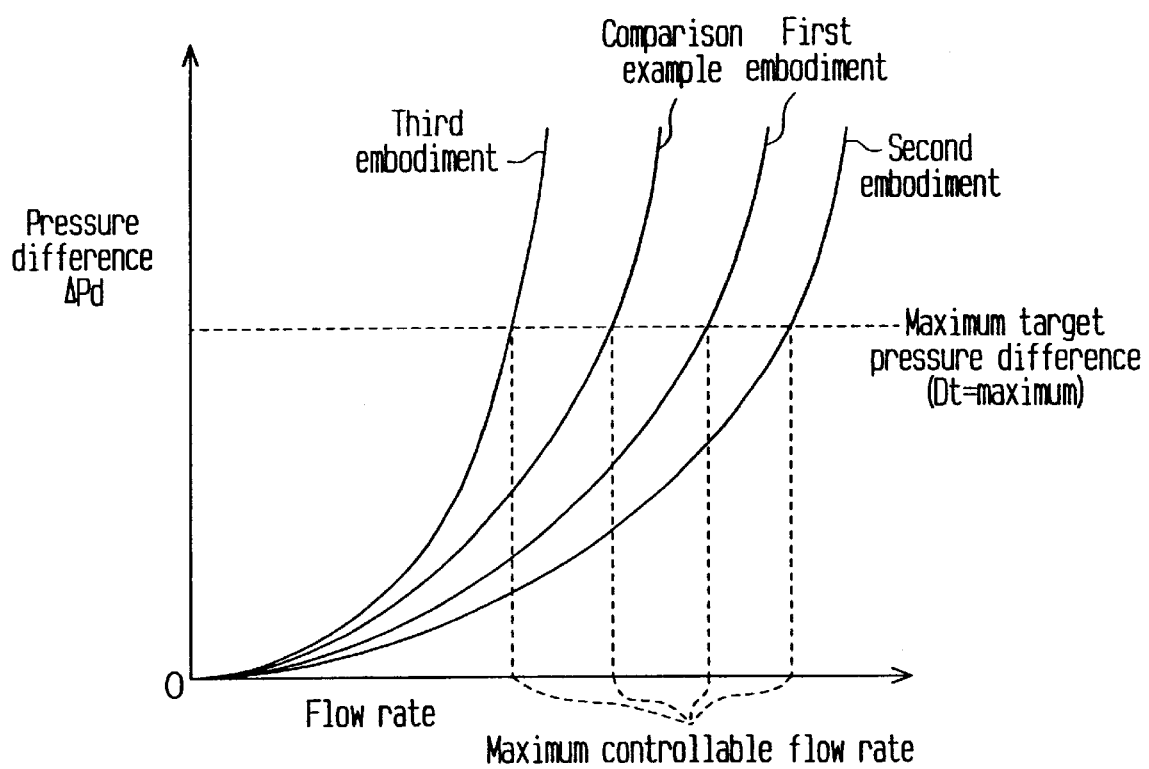
FIG. 4 is a graph showing the relationships between the refrigerant flow rate and the pressure difference between two pressure monitoring points.

The graph of FIG. 4 shows the relationships between the flow rate in the refrigerant circuit and the pressure difference ΔPd. Both in the first embodiment and the comparison example, the pressure difference ΔPd increases as the flow rate increases. However, the rate of increase in the pressure difference ΔPd is lower in the first embodiment than that of the comparison example. In other words, the value of the flow rate that corresponds to a given pressure difference ΔPd is greater in the first embodiment than in the comparison example. The difference in the pressure difference ΔPd between the comparison example and the first embodiment is increased as the pressure difference ΔPd increases.

Figure 3:
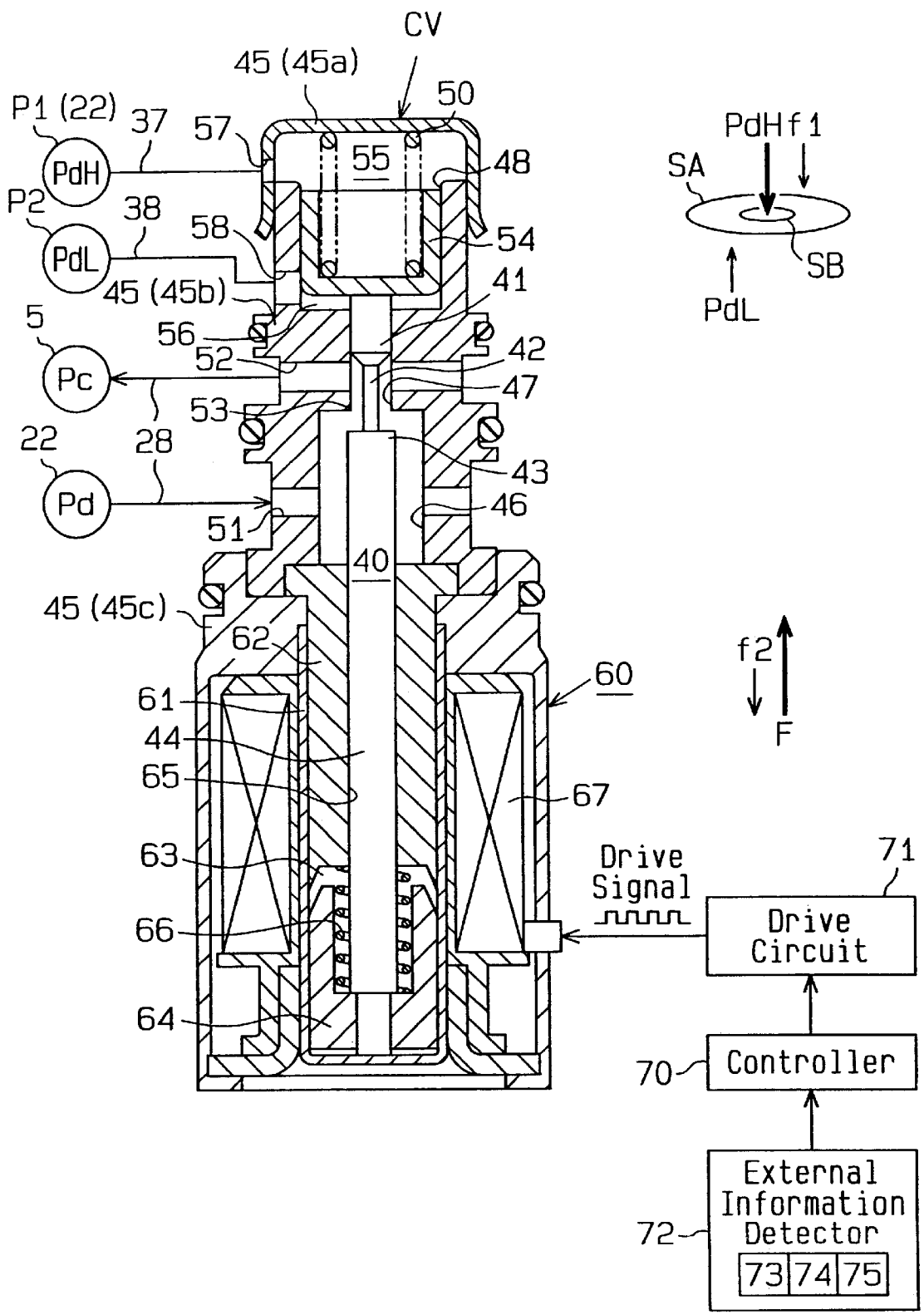
FIG. 3 is a sectional view of a control valve provided in the compressor of FIG. 1.

As shown in FIG. 3, the control valve CV has an inlet valve portion and a solenoid 60. The inlet valve portion controls the opening of the supply passage 28, which connects the discharge chamber 22 with the crank chamber 5. The solenoid 60 serves as an electromagnetic actuator for controlling a rod 40 located in the control valve CV on the basis of an externally supplied electric current. The rod 40 has a distal end portion 41, a valve body 43, a connecting portion 42, which connects the distal end portion 41 and the valve body 43 with each other, and a guide 44. The valve body 43 is part of the guide 44.

A valve housing 45 of the control valve CV has a cap 45a, an upper half body 45b and a lower half body 45c. The upper half portion 45b defines the shape of the inlet valve portion. The lower half body 45c defines the shape of the solenoid 60. A valve chamber 46 and a communication passage 47 are defined in the upper half body 45b. The upper half body 45b and the cap 45a define a pressure sensing chamber 48.

The rod 40 moves in the axial direction of the control valve CV, or vertically as viewed in the drawing, in the valve chamber 46 and the communication passage 47. The valve chamber 46 is selectively connected to and disconnected from the passage 47 in accordance with the position of the rod 40. The communication passage 47 is separated from the pressure sensing chamber 48 by the distal end portion 41 of the rod 40.

The bottom wall of the valve chamber 46 is formed by the upper end surface of a fixed iron core 62. A first radial port 51 allows the valve chamber 46 to communicate with the discharge chamber 22 through an upstream part of the supply passage 28. A second radial port 52 allows the communication passage 47 to communicate with the crank chamber 5 through a downstream part of the supply passage 28. Thus, the first port 51, the valve chamber 46, the communication passage 47, and the second port 52 form a part of the supply passage 28, which communicates the discharge chamber 22 with the crank chamber 5.

The valve body 43 of the rod 40 is located in the valve chamber 46. The inner diameter of the communication passage 47 is larger than the diameter of the connecting portion 42 of the rod 40 and is smaller than the diameter of the guide 44. That is, the opening area SB of the communication passage 47 (the cross sectional area of the distal end portion 41) is larger than the cross sectional area of the connecting portion 42 and smaller than the cross sectional area of the guide 44. A valve seat 53 is formed at the opening of the communication passage 47 (around the valve hole).

When the rod 40 moves from the lowest position shown in FIG. 3 to the highest position, at which the valve body 43 contacts the valve seat 53, the communication passage 47 is closed. Thus, the valve body 43 of the rod 40 serves as an inlet valve body that controls the opening of the supply passage 28.

A cup-shaped pressure sensing member 54 is located in the pressure sensing chamber 48. The pressure sensing member 54 moves axially in the pressure sensing chamber 48 and divides the pressure sensing chamber 48 into a first pressure chamber 55 and a second pressure chamber 56. The pressure sensing member 54 serves as a partition that separates the chambers 55 and 56 from each other and cuts off communication between the chambers 55 and 56. The cross sectional area SA of the pressure sensing member 54 is larger than the opening area SB of the communication passage 47.

A coil spring 50 is located in the P1 pressure chamber. The spring 50 urges the pressure sensing member 54 toward the Second pressure chamber 56.

The First pressure chamber 55 communicates with the discharge chamber 22, and the first pressure monitoring point P1, through a port 57 formed in the cap 45a and through the first pressure introduction passage 37. The Second pressure chamber 56 communicates with the second pressure monitoring point P2 through a port 58 formed in the upper half body 45b of the valve housing 45 and through the second pressure introduction passage 38. Therefore, the first pressure chamber 55 is exposed to the monitored pressure PdH of the first pressure monitoring point P1, and the second pressure chamber 56 is exposed to the monitored pressure PdL of the second pressure monitoring point P2.

The solenoid 60 includes a cup-shaped cylinder 61. A fixed iron core 62 is fitted in the upper part of the cylinder 61. A solenoid chamber 63 is defined in the cylinder 61. A movable iron core 64 is accommodated to move axially in the solenoid chamber 63. An axially extending guide hole 65 is formed in the central portion of the fixed iron core 62. The guide 44 of the rod 40 is located to move axially in the guide hole 65.

The proximal end of the rod 40 is accommodated in the solenoid chamber 63. More specifically, the lower end of the guide 44 is fitted in a hole formed at the center of the movable iron core 64 and fixed by crimping. Thus, the movable iron core 64 and the rod 40 move integrally and axially.

A valve body urging coil 66 is located between the fixed and movable iron cores 62 and 64 in the solenoid chamber 63. The spring 66 urges the movable iron core 64 away from the fixed iron core 62. The spring 66 urges the rod 40 (the valve body 43) downward.

A coil 67 is wound about the stationary core 62 and the movable core 64. The coil 67 receives drive signals from a drive circuit 71 based on commands from a controller 70. The coil 67 generates an electromagnetic force F that corresponds to the value of the current from the drive circuit 71. The electromagnetic force F urges the movable core 64 toward the stationary core 62. The electric current supplied to the coil 67 is controlled by controlling the voltage applied to the coil 67. This embodiment employs duty control for controlling the applied voltage.

The position of the rod 40 in the control valve CV, i.e., the valve opening of the control valve CV, is determined as follows. In the following description, the influence of the pressure of the valve chamber 46, the communication passage 47, and the solenoid chamber 63 on the position of the rod 40 will not be taken into account.

When no current is supplied to the coil 67 (Dt=0%) as shown in FIG. 3, the downward force f1+f2 of the springs 50 and 66 is dominant. As a result, the rod 40 is moved to its lowermost position and causes the valve body 43 to fully open the communication passage 47. Accordingly, the crank pressure Pc is maximized under the current circumstances. Therefore, the difference between the crank pressure Pc and the pressure in the cylinder bores 1a is great, which minimizes the inclination angle of the swash plate 12 and the compressor displacement.

When a current of the minimum duty ratio Dt(min) is supplied to the coil 67, the upward electromagnetic force F is greater than the downward force f1+f2 of the springs 50 and 66, which moves the rod 40 upward. The upward electromagnetic force F is weakened by the downward force f2 of the spring 66. The net upward force (F−f2) acts against the net downward force of the downward force f1 of the spring 50 and the force based on the pressure difference ΔPd. Thus the valve body 43 of the rod 40 is positioned relative to the valve seat 53 to satisfy the following equation:

$$PdH \cdot SA - PdL(SA - SB) = F - f1 - f2$$

For example, if the flow rate of the refrigerant in the refrigerant circuit is decreased because of a decrease in speed of the engine E, the downward force based on the pressure difference ΔPd between the two points decreases, and the electromagnetic force F, at this time, cannot balance the forces acting on the rod 40. Therefore, the rod 40 moves upward, which compresses the springs 50 and 66. The valve body 43 of the rod 40 is positioned such that the increase in the downward force f1+f2 of the springs 50 and 66 compensates for the decrease in the downward force between on the pressure difference ΔPd between the two points. As a result, the opening of the communication passage 47 is reduced and the crank pressure Pc is decreased. As a result, the difference between the crank pressure Pc and the pressure in the cylinder bores 1a is reduced, the inclination angle of the swash plate 12 is increased, and the displacement of the compressor is increased. The increase in the displacement of the compressor increases the flow rate of the refrigerant in the refrigerant circuit to increase the pressure difference ΔPd between the two points.

In contrast, when the flow rate of the refrigerant in the refrigerant circuit is increased due to an increase in the speed of the engine E, the downward force based on the pressure difference ΔPd between the two points increases and the current electromagnetic force F cannot balance the forces acting on the rod 40. Therefore, the rod 40 moves downward, which expands the springs 50 and 66. The valve body 43 of the rod 40 is positioned such that the decrease in the downward force f1+f2 of the springs 50 and 66 compensates for the increase in the downward force based on the pressure difference ΔPd between the two points. As a result, the opening of the communication passage 47 is increased, the crank pressure Pc is increased, and the difference between the crank pressure Pc and the pressure in the cylinder bores 1a is increased. Accordingly, the inclination angle of the swash plate 12 is decreased, and the displacement of the compressor is also decreased. The decrease in the displacement of the compressor decreases the flow rate of the refrigerant in the refrigerant circuit, which decreases the pressure difference ΔPd.

When the duty ratio Dt of the electric current supplied to the coil 67 is increased to increase the electromagnetic force F, the pressure difference ΔPd between the two points cannot balance the forces on the rod 40. Therefore, the rod 40 moves upward, which compresses the springs 50 and 66. The valve body 43 of the rod 40 is positioned such that the increase in the downward force f1+f2 of the springs 50 and 66 compensates for the increase in the upward electromagnetic force F. As a result, the opening of the control valve CV, or the opening of the communication passage 47, is reduced and the displacement of the compressor is increased. Accordingly, the flow rate of the refrigerant in the refrigerant circuit is increased to increase the pressure difference ΔPd.

When the duty ratio Dt of the electric current supplied to the coil 67 is decreased and the electromagnetic force F is decreased accordingly, the pressure difference ΔPd between the two points cannot balance the forces acting on the rod 40. Therefore, the rod 40 moves downward, which decreases the downward force f1+f2 of the springs 50 and 66. The valve body 43 of the rod 40 is positioned such that the decrease in the force f1+f2 of the springs 50 and 66 compensates for the decrease in the upward electromagnetic force F. As a result, the opening of the communication passage 47 is increased and the displacement of the compressor is decreased. Accordingly, the flow rate of the refrigerant in the refrigerant circuit is decreased, which decreases the pressure difference ΔPd.

As described above, the target value of the pressure difference ΔPd is determined by the electromagnetic force F.

The control valve CV automatically determines the position of the rod 40 according to changes of the pressure difference ΔPd to maintain the target value of the pressure difference ΔPd. The target value of the pressure difference ΔPd is varied between a minimum value, which corresponds to the minimum duty ratio Dt(min), and a maximum value, which corresponds to the maximum duty ratio Dt(max), for example 100%.

As shown in FIGS. 2 and 3, the vehicle air conditioner has a controller 70. The controller 70 is a computer control unit including a CPU, a ROM, a RAM, and an I/O interface. An external information detector 72 is connected to the input terminal of the I/O interface. A drive circuit 71 is connected to the output terminal of the I/O interface.

The controller 70 performs an arithmetic operation to determine a proper duty ratio Dt on the basis of various pieces of external information, which is detected by the external information detector 72, and instructs the drive circuit 71 to output a drive signal corresponding to the duty ratio Dt. The drive circuit 71 outputs the drive signal of the instructed duty ratio Dt to the coil 67. The electromagnetic force F by the solenoid 60 of the control valve CV varies in accordance with the duty ratio Dt of the drive signal supplied to the coil 67.

The external information detector 72 is a group of devices for detecting the external information that reflects the cooling performance required for the refrigerant circuit. Sensors of the external information detector 72 include, e.g., an A/C switch (ON/OFF switch of the air conditioner operated by the passenger or the like) 73, a temperature sensor 74 for detecting an in-vehicle temperature Te(t), and a temperature setting unit 75 for setting a desired target value Te(set) of the in-vehicle temperature.

Figure 5:
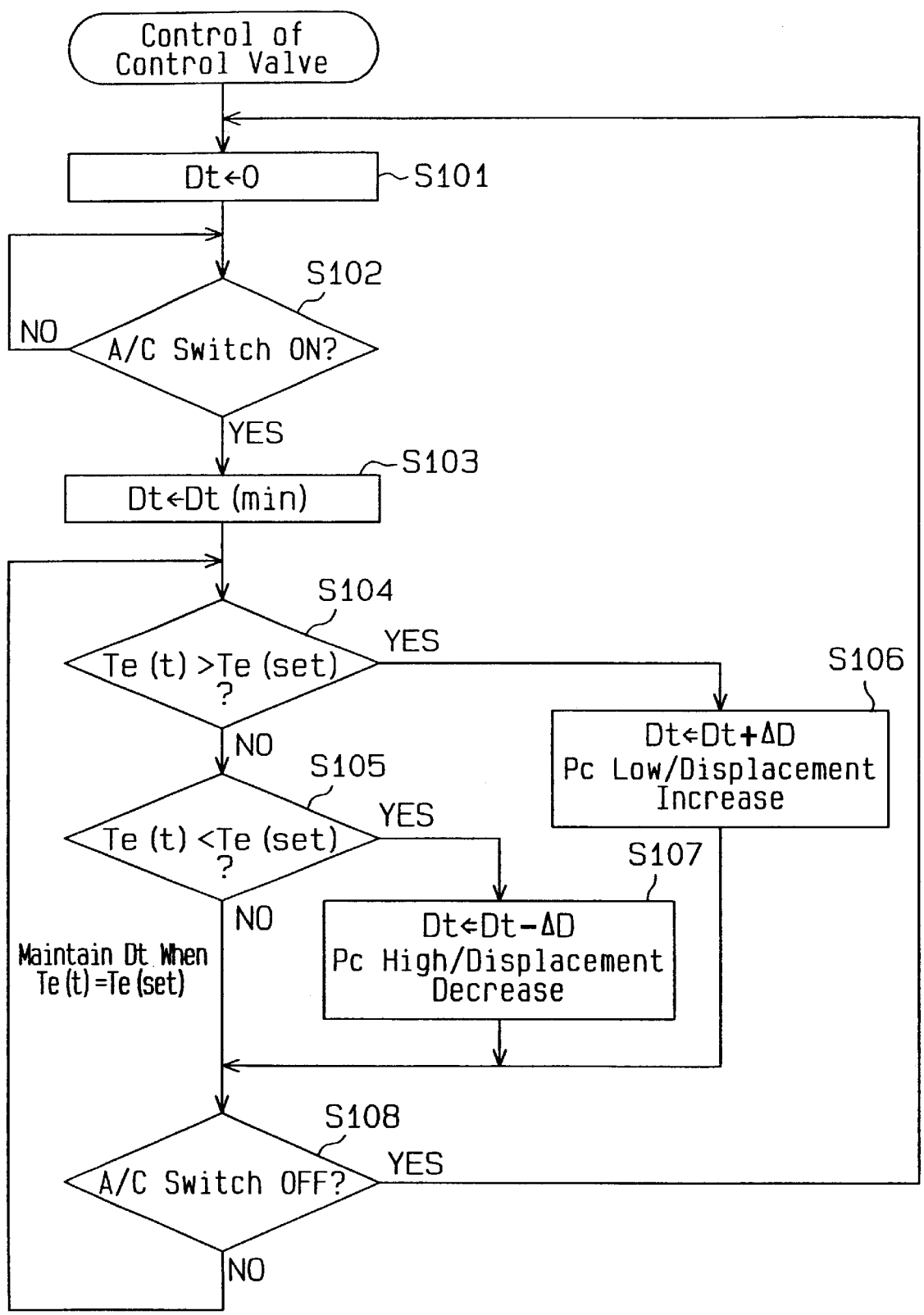
FIG. 5 is a flowchart of a control operation for the control valve.

Next, the duty control of the control valve CV by the controller 70 will be described with reference to the flowchart of FIG. 5.

When the ignition switch (or the start switch) of the vehicle is turned on, the controller 70 is supplied with an electric current to start processing. In step S101, the controller 70 makes various initializations. For example, the controller 70 sets an initial duty ratio Dt of zero. After this, condition monitoring and internal processing of the duty ratio Dt are performed.

In step S102, the controller 70 monitors the ON/OFF state of the A/C switch 73 until the switch 73 is turned on. When the A/C switch 73 is turned on, in step S103, the controller 70 sets the duty ratio Dt of the control valve CV to the minimum duty ratio Dt(min) and starts the internal self-control function (target pressure difference maintenance) of the control valve CV.

In step S104, the controller 70 judges whether the detected temperature Te(t) by the temperature sensor 74 is higher than the target temperature Te(set). If step S104 is negative, in step S105, the controller 70 further judges whether the detected temperature Te(t) is lower than the target temperature Te(set). When step S105 is negative, then the detected temperature Te(t) is equal to the target temperature Te(set). Therefore, the duty ratio Dt need not be changed. Thus, the controller 70 does not instruct the drive circuit 71 to change the duty ratio Dt and step S108 is performed.

If step S104 is positive, the interior of the vehicle is hot and the thermal load is high. Therefore, in step S106, the controller 70 increases the duty ratio Dt by a unit quantity ΔD and instructs the drive circuit 71 to increment the duty ratio Dt to a new value (Dt+ΔD). As a result, the valve opening of the control valve CV is somewhat reduced, the displacement of the compressor is increased, the ability of the evaporator 33 to transfer heat is increased, and the temperature Te(t) is lowered.

If step S105 is positive, the interior of the vehicle is relatively cool and the thermal load is low. Therefore, in step S107, the controller 70 decrements the duty ratio Dt by a unit quantity ΔD, and instructs the drive circuit 71 to change the duty ratio Dt to the new value (Dt−ΔD). As a result, the valve opening of the control valve CV is somewhat increased, the displacement of the compressor is decreased, the ability of the evaporator 33 to transfer heat is reduced, and the temperature Te(t) is raised.

In step S108, it is judged whether or not the A/C switch 73 is turned off. If step S108 is negative, step S104 is performed. When step S108 is positive, step S101, in which the supply of the current to the control valve CV is stopped, is performed.

As described above, by changing the duty ratio Dt in step S106 and/or S107, even when the detected temperature Te(t) deviates from the target temperature Te(set), the duty ratio Dt is gradually optimized and the detected temperature Te(t) converges to the vicinity of the target temperature Te(set).

The above illustrated embodiment has the following advantages.

(1) In the first embodiment, the suction pressure Ps, which is influenced by the thermal load in the evaporator 33, is not directly referred to for controlling the opening of the control valve CV. Instead, the pressure difference ΔPd between the pressure monitoring points P1 and P2 in the refrigerant circuit is directly controlled for feedback controlling the displacement of the compressor. Therefore, the displacement is scarcely influenced by the thermal load of the evaporator 33. In other words, the displacement is quickly and accurately controlled by external control of the controller 70 in accordance with the speed of the engine E. Particularly, when the engine speed increases, the compressor displacement is quickly decreased, which improves the fuel economy of the engine E.

(2) The target pressure difference, according to which the opening of the control valve CV is controlled, is changed by changing the duty ratio Dt. Thus, compared to a control valve that has no electromagnetic structure, or has a fixed target pressure difference, the control valve CV is suitable for finely controlling the air conditioner as shown in the flowchart of FIG. 5.

(3) In the control valve of the comparison example, in which the pressures monitored PdH, PdL at the pressure monitoring points P1, P2 are static pressures, the distance between the pressure monitoring points P1 and P2 or the throttle amount of the restrictor 39 must be changed to change the relationship between the flow rate and the pressure difference ΔPd. However, in the first embodiment, a dynamic pressure element is added to the static pressure of refrigerant that is flowing through the second pressure monitoring point P2 and the resultant is introduced to the control valve CV and is used as the monitored pressure PdL. Thus, the relationship between the flow rate and the pressure difference ΔPd is different from that of the comparison example. That is, in the first embodiment, the monitored pressure PdL reflects dynamic pressure, which enables the relationship between the flow rate and the pressure difference ΔPd to be variable, which adds to the flexibility of the design.

(4) When the duty ratio Dt is maximum, the pressure difference ΔPd that satisfies the above equation is the maximum target pressure difference of the control valve CV, which represents the maximum controllable flow rate of the refrigerant circuit. As described above, for a given level of the pressure difference ΔPd, the flow rate of refrigerant is greater in the first embodiment than in the comparison example. Compared to the comparison example, the maximum controllable flow rate is greater in the first embodiment.

In the comparison example, the throttle amount of the restrictor 39 may be decreased for increasing the maximum controllable flow rate of refrigerant so that the pressure difference ΔPd is not significantly increased when the flow rate increases. However, if the throttle amount of the restrictor 39 is decreased, the pressure difference ΔPd is scarcely changed by a change of the flow rate when the flow rate is small. Therefore, when controlling the flow rate in a low flow rate region, the duty ratio Dt must be adjusted in a narrow range, which makes it difficult to accurately control the flow rate.

As described above, the first embodiment increases the maximum controllable flow rate while maintaining the controllability of the flow rate in the low flow rate region.

(5) A compressor for a vehicle air conditioner is generally accommodated in small engine compartment, which limits the size of the compressor. Therefore, the size of the control valve CV and the size of the solenoid 60 (coil 67) are limited. Also, the solenoid 60 is generally driven by a battery that is used for controlling the engine. The voltage of the battery is, for example, between twelve to twenty-four volts.

To increase the maximum controllable flow rate in the comparison example, the maximum level of the electromagnetic force F of the solenoid 60, which represents the maximum pressure difference, may be increased. To increase the maximum level of the electromagnetic force F, the size of the coil 67 must be increased or the voltage of the power source must be increased. However, this requires a significant change of the existing design of the surrounding devices and is therefore almost impossible. In other words, to increase the maximum controllable flow rate of the control valve CV, which is used in a compressor of a vehicle air conditioner, the first embodiment, does not increase the size of the coil 67 (the control valve CV) and the voltage of the power source, is most suitable.

(6) The total pressure of the second pressure monitoring point P2 is used as the monitored pressure PdL at the pressure monitoring point P2 and is introduced to the control valve CV. Therefore, when the flow rate is increased in the high flow rate region, the pressure difference ΔPd is effectively prevented from being significantly increased, which is effective for obtaining the advantage (4).

(7) The pressure difference ΔPd in the control valve CV is mechanically detected and directly affects the position of the rod 40 (the valve body 43). Therefore, the control valve CV does not require an expensive pressure sensor for electrically detecting the pressure difference ΔPd. This reduces the number of parameters for computing the duty ratio Dt and, thus, reduces the calculation load of the controller 70.

(8) The bent portion 36a of the pipe 36 is formed such that the refrigerant circuit is fitted in the vehicle compartment. The second pressure monitoring point P2 is located in the bent portion 36a. The opening 38a of the second pressure introduction passage 38 opens to the bent portion 36a. The axis of the opening 38a is substantially parallel to the direction of the flow of refrigerant gas that flows into the opening 38a. Therefore, the total pressure at the second pressure monitoring point P2 is introduced to the control valve CV by a simple structure.

Figure 6:
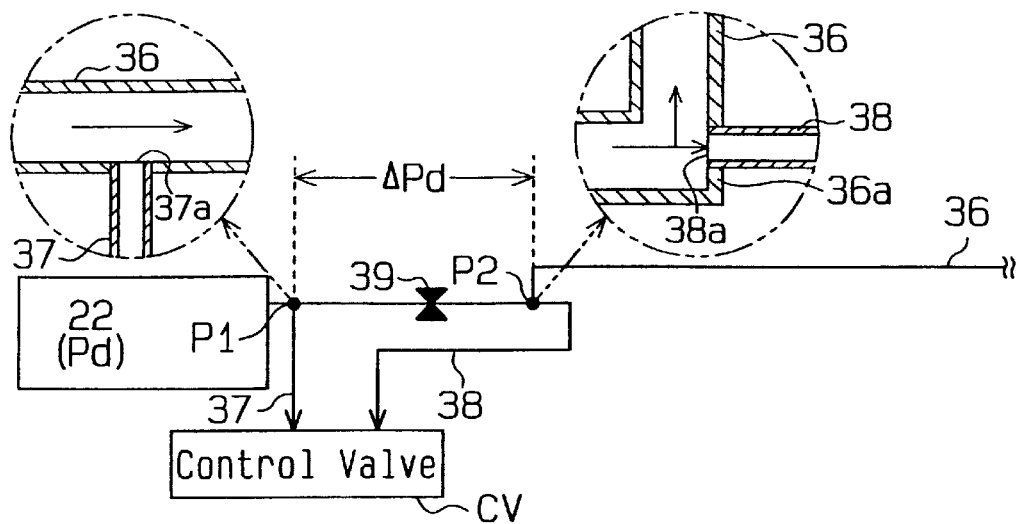
FIG. 6 is a partial circuit diagram schematically showing a refrigerant circuit according to a second embodiment.

FIG. 6 illustrates a second embodiment. In the second embodiment, the first pressure monitoring point P1 is located in the pipe 36 between the discharge chamber 22 and the restrictor 39. The first pressure introduction passage 37 is connected to the pipe 36 at a right angle so that the opening 37a of the first pressure introduction passage 37 is perpendicular to the flow of refrigerant. Thus, the static pressure of refrigerant gas that flows through the first pressure monitoring point P1 is introduced into the control valve CV (the first pressure chamber 55) as the monitored pressure PdH of the first pressure monitoring point P1.

In the second embodiment, the first pressure monitoring point P1 is located in the pipe 36, in which the speed of refrigerant is higher than in the discharge chamber 22. The total pressure at the first pressure monitoring point P1 is substantially equal to that of the discharge chamber 22. However, the ratio of dynamic pressure to the total pressure is higher at the first pressure monitoring point P1. Therefore, compared to the first embodiment, a lower monitored pressure PdH (static pressure) is introduced into the control valve CV. Thus, as shown by characteristic line labeled as second embodiment in the graph of FIG. 4, an increase of the flow rate in the high flow rate region increases the pressure difference ΔPd by a relatively small amount, which increases the maximum controllable flow rate.

Figure 7:
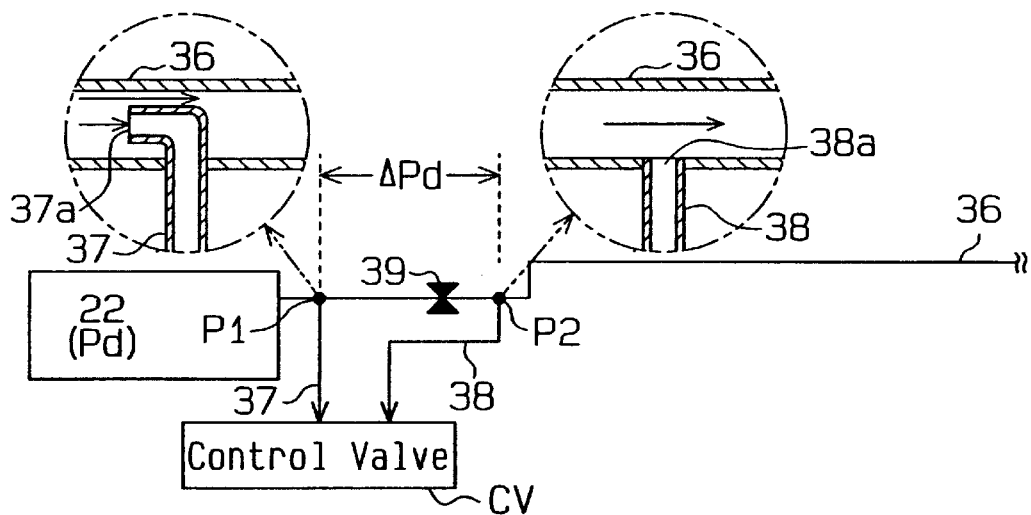
FIG. 7 is a partial circuit diagram schematically showing a refrigerant circuit according to a third embodiment.

FIG. 7 illustrates a third embodiment. The third embodiment is designed more for improving the controllability of the refrigerant flow rate than for increasing the maximum controllable flow rate.

In the third embodiment, the first pressure monitoring point P1 is located in the pipe 36 between the discharge chamber 22 and the restrictor 39. The end of the first pressure introduction passage 37 is located in the pipe 36 and bent at a right angle. The opening 37a of the first pressure introduction passage 37 faces the flow of refrigerant along the axis of the pipe 36. Therefore, the total pressure of refrigerant that flows through the first pressure monitoring point P1 is introduced into the control valve CV (the first pressure chamber 55) as the monitored pressure PdH. Thus, compared to a case where a static pressure is used as the monitored pressure PdH, the monitored pressure PdH of the third embodiment is increased by a greater amount as the flow rate of refrigerant increases.

The second pressure introduction passage 38 is connected to the pipe 36 at a right angle. The opening 38a of the second pressure introduction passage 38 is perpendicular to the flow of refrigerant in the pipe 36. Therefore, like in the comparison example, the static pressure of refrigerant gas that flows through the second pressure monitoring point P2 is introduced to the control valve CV (the second pressure chamber 56) as the monitored pressure PdL.

As shown by characteristic line that is labeled as third embodiment in FIG. 4, the pressure difference ΔPd is greatly changed by a change of the flow rate in the intermediate and high flow rate regions. Therefore, the flow rate is accurately controlled by using the duty ratio Dt in a relatively wide range.

To improve the controllability of the flow rate in the comparison example, the throttle amount of the restrictor 39 may be increased so that the pressure difference ΔPd is greatly changed in accordance with a change in the flow rate. However, if the throttle amount of the restrictor 39 is increased, the pressure loss at the restrictor 39 is also increased, which degrades the efficiency of the air conditioner and thus lowers the fuel economy of the engine E.

It should be apparent to those skilled in the art that the present invention may be embodied in many other specific forms without departing from the spirit or scope of the invention. Particularly, it should be understood that the invention may be embodied in the following forms.

Figure 8:
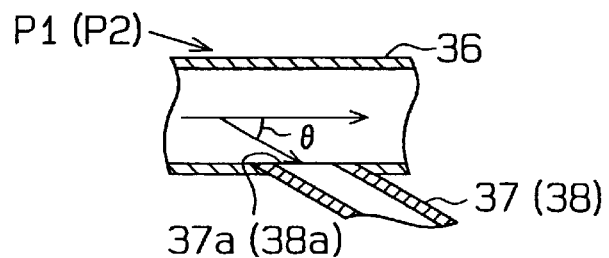
FIG. 8 is an enlarged partial cross-sectional view illustrating a pressure monitoring point according to another embodiment.

To cause the monitored pressures PdH and PdL reflect dynamic pressure, only dynamic pressure may be introduced to the control valve CV by using a pitot tube. Alternatively, the pressure introduction passage 37 (38) may be inclined to the pipe 36 at the pressure monitoring point P1 (P2) by an angle θ as shown in FIG. 8. In this case, the static pressure and the dynamic pressure, which is weakened by the angle θ, are introduced into the control valve CV.

The monitored pressures PdH and PdL both may reflect the dynamic pressure at the corresponding pressure monitoring points P1, P2. In this case, the structure shown in FIG. 8 may be employed. Further, the degree of influence of the dynamic pressure at the pressure monitoring points P1, P2 may be adjusted by changing the angle θ. This permits the relationship between the flow rate and the pressure difference ΔPd to be shifted either to increase the maximum flow rate or to improve the controllability of the flow rate compared to the comparison example.

Figure 9:
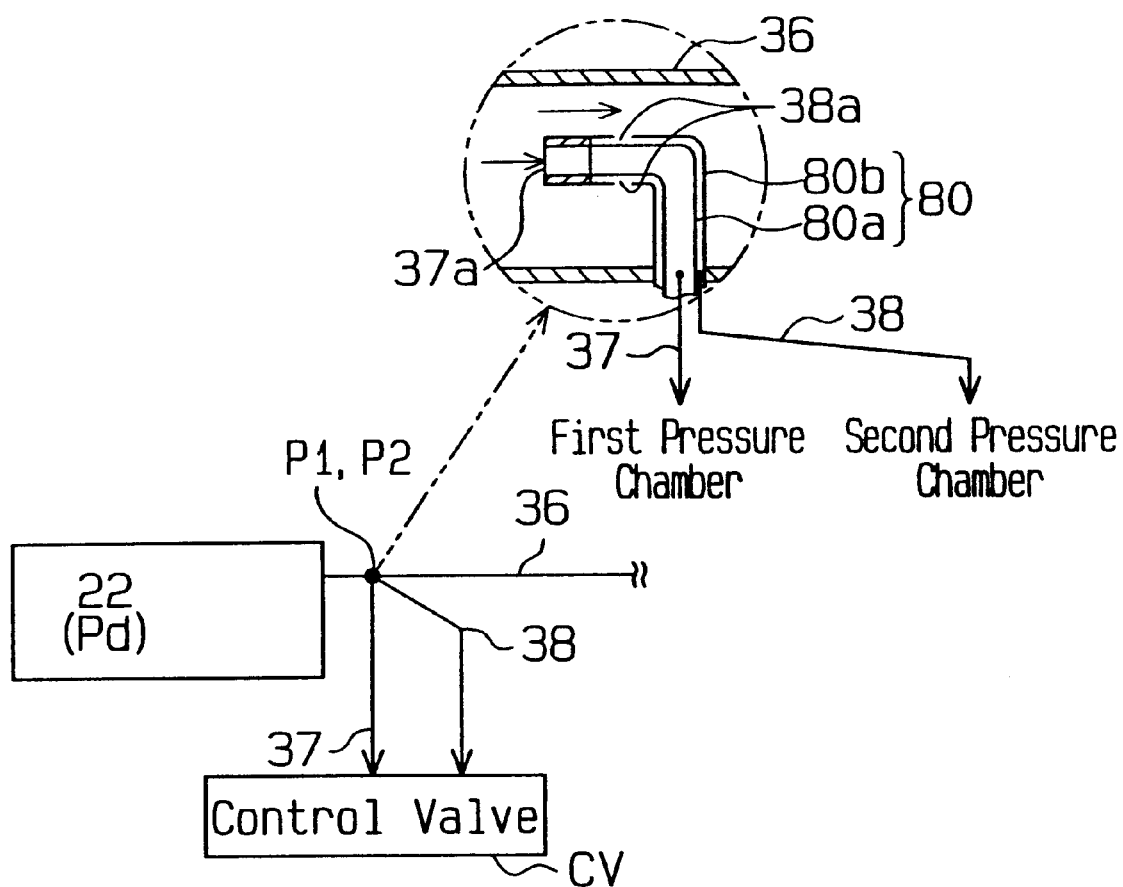
FIG. 9 is a partial circuit diagram schematically showing a refrigerant circuit according to another embodiment.

As shown in FIG. 9, the first and second pressure monitoring points P1 and P2 may be located close to each other in the pipe 36, and a pitot tube 80 may be located at the pressure monitoring points P1, P2. The pitot tube 80 has a total pressure pipe 80a and a static pressure pipe 80b. The total pressure pipe 80a has an opening 37a that faces the flow of refrigerant. The total pressure pipe 80a corresponds to the first pressure introduction passage 37 in the above illustrated embodiments and is connected to the first pressure chamber 55 of the control valve CV. The static pressure pipe 80b has openings 38a that are perpendicular to the flow of refrigerant. The static pressure pipe 80b corresponds to the second pressure introduction passage 38 in the above illustrated embodiments and is connected to the second pressure chamber 56 of the control valve CV. In this structure, the pressure difference ΔPd represents the difference between the monitored pressure PdH (total pressure) at the first pressure monitoring point P1 and the monitored pressure PdL (static pressure) at the second pressure monitoring point P2. In other words, the pressure difference ΔPd represents the dynamic pressure, which is obtained by subtracting the static pressure from the total pressure, of refrigerant that flows through the pressure monitoring points P1 and P2. Since the dynamic pressure shows a positive correlation with the speed of refrigerant, or with the flow rate of refrigerant, the flow rate is controlled by the control valve CV in the same manner as the above illustrated embodiments and as the comparison example without employing the restrictor 39. That is, compared to a case where the word pressure is interpreted as static pressure, the embodiment of FIG. 9 adds to flexibility of the design of the air conditioner.

The automatic function of the control valve CV may be omitted and the control valve CV may only include the electromagnetic valve. In this case, a pressure sensor is located at each of the pressure sensing points P1 and P2. The controller 70 computes the duty ratio Dt based not only on signals from the external information detector 72 but also on signals from the pressure sensors and electrically controls the control valve CV based on the pressure difference ΔPd. This simplifies the structure of the control valve CV and reduces the size of the control valve CV.

As labeled as another embodiment in FIG. 2, the first pressure monitoring point P1 may be located between the evaporator 33 and the suction chamber 21 (in the pipe 35 in the drawing), and the second pressure monitoring point P2 may be located in the suction pressure zone and downstream of the first pressure monitoring point P1 (in the suction chamber 21 in the drawing).

The control valve may be a so-called outlet control valve for controlling the crank pressure Pc by controlling the opening of the bleed passage 27.

The present invention can be embodied in a control valve of a wobble type variable displacement compressor.

A clutch mechanism such as an electromagnetic clutch may be employed as the power transmission mechanism PT.

Therefore, the present examples and embodiments are to be considered as illustrative and not restrictive and the invention is not to be limited to the details given herein, but may be modified within the scope and equivalence of the appended claims.

What is claimed is:

1. An air conditioner including a refrigerant circuit, the refrigerant circuit having a variable displacement compressor, the air conditioner comprising:
a displacement control mechanism, which controls the displacement of the compressor based on the pressure difference between a first pressure monitoring point and a second pressure monitoring point, which are located in the refrigerant circuit, such that the pressure difference seeks a predetermined target value, the second pressure monitoring point being downstream of the first pressure monitoring point, wherein the first pressure monitoring point or the second pressure monitoring point is arranged in the refrigerant circuit such that a pressure that includes the dynamic pressure of refrigerant in the refrigerant circuit is introduced into the displacement control mechanism through the first pressure monitoring point or the second pressure monitoring point.

2. The air conditioner according to claim 1, wherein the refrigerant circuit includes a condenser, a decompression device and an evaporator, wherein the compressor has a discharge pressure zone, the pressure of which is a discharge pressure, and a suction pressure zone, the pressure of which is a suction pressure, wherein the refrigerant circuit further has a high pressure passage, which extends from the discharge pressure zone to the condenser, and a low pressure passage, which extends from the evaporator to the suction pressure zone, and wherein the first pressure monitoring point and the second pressure monitoring point are located in a part of the refrigerant circuit that includes the discharge pressure zone, the condenser and the high pressure passage.

3. The air conditioner according to claim 1, wherein the refrigerant circuit includes a condenser, a decompression device and an evaporator, wherein the compressor has a discharge pressure zone, the pressure of which is a discharge pressure, and a suction pressure zone, the pressure of which is a suction pressure, wherein the refrigerant circuit further has a high pressure passage, which extends from the discharge pressure zone to the condenser, and a low pressure passage, which extends from the evaporator to the suction pressure zone, and wherein the first pressure monitoring point and the second pressure monitoring point are located in a part of the refrigerant circuit that includes the evaporator, the suction pressure zone and the low pressure passage.

4. The air conditioner according to claim 1, wherein the first pressure monitoring point is arranged in the refrigerant circuit such that the static pressure of refrigerant in the refrigerant circuit is introduced into the displacement control mechanism through the first pressure monitoring point, and wherein the second pressure monitoring point is arranged in the refrigerant circuit such that a pressure that includes the static pressure and the dynamic pressure of refrigerant in the refrigerant circuit is introduced into the displacement control mechanism through the second pressure monitoring point.

5. The air conditioner according to claim 1, wherein the first pressure monitoring point is arranged in the refrigerant circuit such that a pressure that includes the static pressure and the dynamic pressure of refrigerant in the refrigerant circuit is introduced into the displacement control mechanism through the first pressure monitoring point, wherein the second pressure monitoring point is arranged such that the static pressure of refrigerant in the refrigerant circuit is introduced into the displacement control mechanism through the second pressure monitoring point.

6. The air conditioner according to claim 2, wherein the second pressure monitoring point is arranged in the high pressure passage such that a pressure that includes the dynamic pressure of refrigerant in the high pressure passage is introduced into the displacement control mechanism through the second pressure monitoring pint.

7. The air conditioner according to claim 6, wherein the high pressure passage includes a bent portion, wherein a pressure introduction passage extends from the displacement control mechanism and is connected to the bent portion, wherein the pressure introduction passage includes an inlet, which opens to the interior of the high pressure passage and functions as the second pressure monitoring point, wherein the axis of the inlet is substantially parallel to the flow of refrigerant that flows from the high pressure passage into the inlet so that a pressure that includes the static pressure and the dynamic pressure of refrigerant in the high pressure passage is introduced from the inlet into the displacement control mechanism through the pressure introduction passage.

8. The air conditioner according to claim 6, wherein the first pressure monitoring point is arranged in the refrigerant circuit such that the static pressure of refrigerant in the refrigerant circuit is introduced into the displacement control mechanism through the first pressure monitoring point.

9. The air conditioner according to claim 8, wherein the first pressure monitoring point is located in the discharge pressure zone or in the high pressure passage.

10. The air conditioner according to claim 2, wherein the first pressure monitoring point is arranged in the high pressure passage such that a pressure that includes the dynamic pressure of refrigerant in the high pressure passage is introduced into the displacement control mechanism through the first pressure monitoring point.

11. The air conditioner according to claim 10, wherein the second pressure monitoring point is arranged in the high pressure passage such that the static pressure of refrigerant in the high pressure passage is introduced into the displacement control mechanism through the second pressure monitoring point.

12. The air conditioner according to claim 1, further comprising:
a device, which detects external information that reflects the cooling performance required for the refrigerant circuit; and
a controller, which determines the target value according to external information detected by the device and commands the displacement control mechanism to operate according to the determined target value.

13. The air conditioner according to claim 12, wherein the compressor includes a crank chamber, an inclining drive plate located in the crank chamber and a piston, which is reciprocated by the drive plate, wherein the inclination angle of the drive plate changes in accordance with the pressure in the crank chamber, and the inclination angle of the drive plate determines the stroke of the piston and the compressor displacement, wherein the displacement control mechanism includes a control valve located in the compressor, and wherein the control valve operates in accordance with the pressure difference, thereby adjusting the pressure in the crank chamber.

14. The air conditioner according to claim 13, wherein the control valve includes:
a valve body;
an actuator for urging the valve body, wherein the controller controls current supplied to the actuator such that the urging force of the actuator corresponds to the target value; and
a pressure receiving body, wherein the pressure receiving body actuates the valve body in accordance with the pressure difference acting on the pressure receiving body such that the pressure difference seeks the target value.

15. An air conditioner including a refrigerant circuit, the refrigerant circuit having a condenser, a decompression device, an evaporator and a variable displacement compressor, wherein the compressor has a discharge pressure zone, the pressure of which is a discharge pressure, and a suction pressure zone, the pressure of which is a suction pressure, wherein the refrigerant circuit further has a high pressure passage, which extends from the discharge pressure zone to the condenser, and a low pressure passage, which extends from the evaporator to the suction pressure zone, the air conditioner comprising:
a displacement control mechanism, which controls the displacement of the compressor based on the pressure difference between a first pressure monitoring point and a second pressure monitoring point, which are located in the refrigerant circuit, such that the pressure difference seeks a predetermined target value,
wherein the first pressure monitoring point and the second pressure monitoring point are located in a part of the refrigerant circuit that includes the discharge pressure zone, the condenser and the high pressure passage,
wherein the first pressure monitoring point is located upstream of the second monitoring pint and is arranged in the refrigerant circuit such that the static pressure of refrigerant in the refrigerant circuit is introduced into the displacement control mechanism through the first pressure monitoring point, and
wherein the second pressure monitoring point is arranged in the refrigerant circuit such that a pressure that includes the static pressure and the dynamic pressure of refrigerant in the refrigerant circuit is introduced into the displacement control mechanism through the second pressure monitoring point.

16. An air conditioner including a refrigerant circuit, the refrigerant circuit having a condenser, a decompression device, an evaporator and a variable displacement compressor, wherein the compressor has a discharge pressure zone, the pressure of which is a discharge pressure, and a suction pressure zone, the pressure of which is a suction pressure, wherein the refrigerant circuit further has a high pressure passage, which extends from the discharge pressure zone to the condenser, and a low pressure passage, which extends from the evaporator to the suction pressure zone, the air conditioner comprising:
a displacement control mechanism, which controls the displacement of the compressor based on the pressure difference between a first pressure monitoring point and a second pressure monitoring point, which are located in the refrigerant circuit, such that the pressure difference seeks a predetermined target value, wherein the first pressure monitoring point and the second pressure monitoring point are located in a part of the refrigerant circuit that includes the discharge pressure zone, the condenser and the high pressure passage, wherein the first pressure monitoring point is located upstream of the second monitoring pint and is arranged in the refrigerant circuit such that a pressure that includes the static pressure and the dynamic pressure of refrigerant in the refrigerant circuit is introduced into the displacement control mechanism through the first pressure monitoring point, and wherein the second pressure monitoring point is arranged in the refrigerant circuit such that the static pressure of refrigerant in the refrigerant circuit is introduced into the displacement control mechanism through the second pressure monitoring point.

* * * * *